United States Patent
Naganawa (10) Patent No.: US 6,637,914 B2
(45) Date of Patent: Oct. 28, 2003

(54) VEHICLE HEADLAMP

(75) Inventor: Masahito Naganawa, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/128,356

(22) Filed: Apr. 24, 2002

(65) Prior Publication Data

US 2002/0159268 A1 Oct. 31, 2002

(30) Foreign Application Priority Data

Apr. 26, 2001 (JP) ..................... P.2001-128574

(51) Int. Cl.⁷ ................. B60Q 1/00; F21V 21/28; F21V 21/29
(52) U.S. Cl. .............. 362/465; 362/518; 362/287; 362/508
(58) Field of Search ................ 362/460, 464, 362/465, 518, 538, 42, 43, 531, 287, 508

(56) References Cited

U.S. PATENT DOCUMENTS

| | | | |
|---|---|---|---|
| 3,700,883 A | * 10/1972 | Donohue et al. | 362/518 |
| 5,988,837 A | * 11/1999 | Eichhorn et al. | 362/464 |
| 6,000,816 A | * 12/1999 | Serizwa et al. | 362/297 |
| 6,004,014 A | * 12/1999 | Yamaura et al. | 362/518 |
| 6,325,528 B1 | * 12/2001 | Wittmeier et al. | 362/514 |
| 6,354,718 B1 | * 3/2002 | Iwake et al. | 362/351 |
| 6,402,355 B1 | * 6/2002 | Kinouchi | 362/514 |
| 2002/0093827 A1 | * 7/2002 | Ishida | |
| 2002/0145880 A1 | * 10/2002 | Nouet | |
| 2003/0031020 A1 | * 2/2003 | Komatsu | |

FOREIGN PATENT DOCUMENTS

EP 0866261 A2 * 9/1998 ............ F21M/3/16

* cited by examiner

Primary Examiner—Stephen Husar
Assistant Examiner—Sharon Payne
(74) Attorney, Agent, or Firm—Sughrue Mion, PLLC (57) ABSTRACT

When the vehicle body rolls to the oncoming lane, a light source bulb is turned to a direction opposite to a rolling direction to keep the posture of the light source bulb in an erect state. Accordingly, a horizontal cut-off line CL1 of a low-beam light distribution pattern P is prevented from slanting downward to the oncoming lane side. A horizontal cut-off line forming area $20a1$ of a reflector 20 is formed with a plurality of reflection elements $20s1a$ and $20s1b$ and the like. Those elements are formed extending from the upper end to the lower end and slanting, at an angle of 5°, downward to the optical axis Ax1 with respect to the vertical direction. As a result, when the vehicle body rolls to the oncoming lane side, the reflection elements $20s1a$ and $20s1b$ and the like are substantially orthogonal to a light-dark borderline L1 formed by an inner shade 18c of the light source bulb, to thereby sharpen the horizontal cut-off line.

4 Claims, 11 Drawing Sheets

VEHICLE HEADLAMP

BACKGROUND OF THE INVENTION

The present invention relates to a vehicle headlamp, and more particularly a headlamp mounted on a vehicle, such as a 4-wheel vehicle.

Many vehicle headlamps are each configured to effect a low-beam irradiation in a light distribution pattern in which a horizontal cut-off line is disposed on an oncoming lane side with respect to the front direction of a lighting device.

Figure 10:
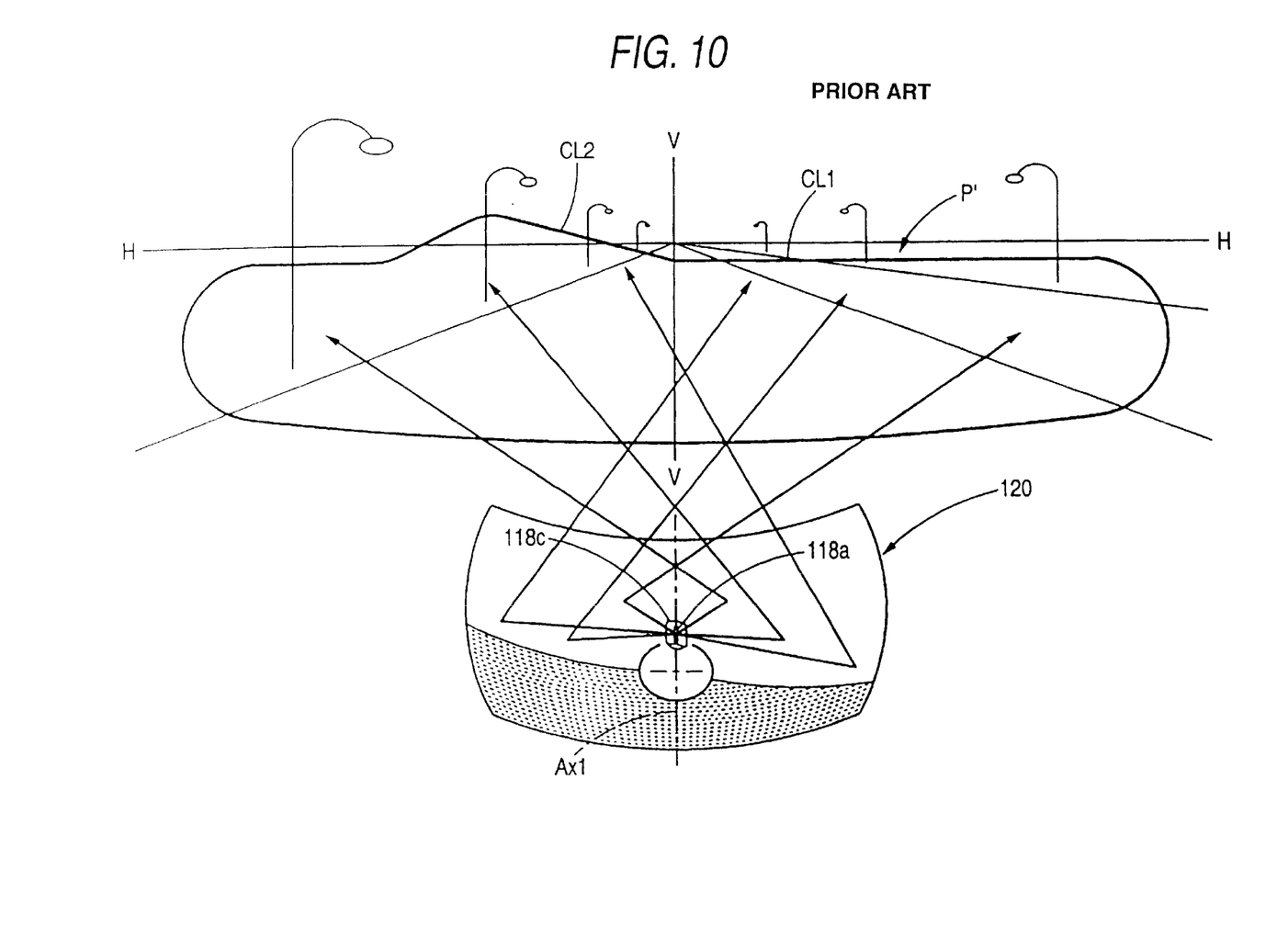
FIG. 10 is a diagram, similar to FIG. 3, showing a conventional vehicle headlamp.

In a low beam light distribution pattern P' of the left light distribution shown in FIG. 10, for example, a horizontal cut-off line CL1 is disposed on the oncoming lane side (right side), and an oblique cut-off line CL2 slanting upward from the horizontal cut-off line CL1 is disposed on the own lane side (left side), whereby a forward visibility of a driver in his own vehicle is secured on the left-hand traffic vehicle lane, while preventing a glare imparted to the oncoming vehicle's driver.

In the vehicle headlamp illustrated in the figure, light emanating from the light source 118a of a light source bulb having a light source 118a disposed coaxially with an optical axis Ax1 extending substantially in the back/forth direction, and an inner shade 118c covering the light source 118a over a predetermined angular range so as to block light going downward from the light source 118a, is reflected by a reflector 120, thereby forming the low beam light distribution pattern P'.

Figure 11:
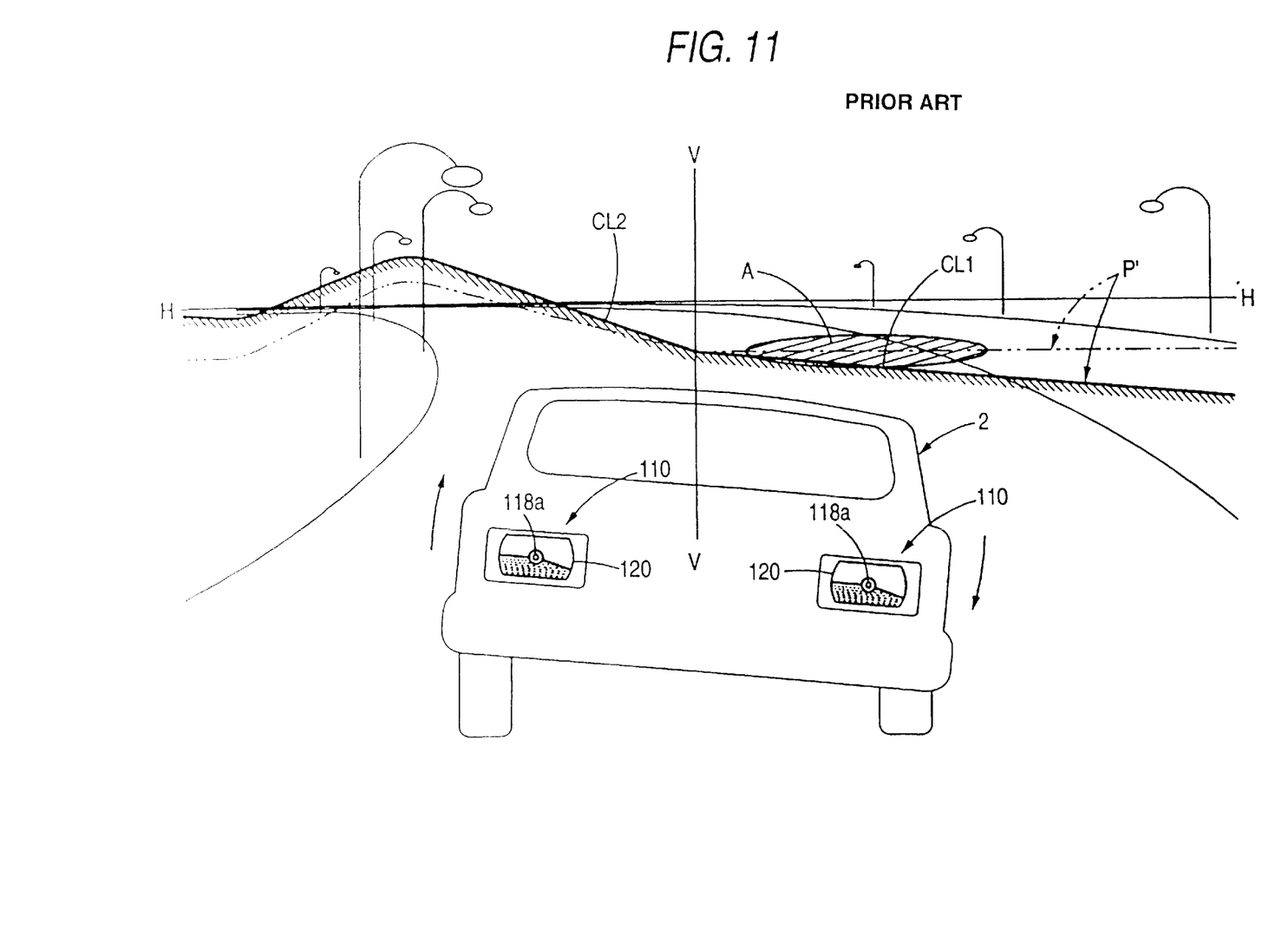
FIG. 11 is a diagram, similar to FIG. 6, showing an operation of the conventional headlamp.

When the vehicle is in running motion of turning, the vehicle body rolls due to centrigugal force. For example, when the vehicle body rolls to the oncoming lane side (right side) as in running motion of left turning as shown in FIG. 11, the right and left lamps (headlamps) 110 also tilt to the oncoming lane side (right side). Accordingly, a low-beam light distribution pattern P' formed by the beam emitted from the headlamp 110 tilts to the oncoming lane side (right side) (the low-beam light distribution pattern P' before tilted is indicated by a two-dot chain line). At this time, the horizontal cut-off line CL1 slants downward to the right. Accordingly, a visibility of a road surface in front of the vehicle (specifically, a visibility of a shaded area A located near the front part of the horizontal cut-off line CL1) deteriorates.

SUMMARY OF THE INVENTION

Accordingly, an object of the present invention is to provide a vehicle headlamp configured to effect a low-beam irradiation in a light distribution pattern in which a horizontal cut-off line is disposed on the oncoming lane side in the front direction of the lighting device, which the headlamp is improved such that even when the vehicle body rolls to the oncoming lane side, a visibility of a road surface in front of the vehicle is sufficiently secured.

To achieve the above object, much ingenuity has been exercised to produce inventive and unique elements constituting the lighting device, with provision of a bulb driving mechanism.

According to the present invention, there is provided a vehicle headlamp configured to effect a low-beam irradiation in a light distribution pattern in which a horizontal cut-off line is disposed on the oncoming lane side in the front direction of a lighting device, the headlamp comprising 1) a light source bulb including a light source disposed coaxially with an optical axis extending substantially in the back/forth direction, and a shade member which covers the light source over a predetermined angular range, 2) a reflector for reflecting the light from the light source to the front, and 3) a translucent cover provided in front of the reflector, wherein a horizontal cut-off line forming area for controlling a light distribution control for forming the horizontal cut-off line is provided on the reflector or the translucent cover, in that at least apart of the horizontal cut-off line forming area is formed with a plurality of reflection elements or lens elements, the reflection elements or the lens elements slant toward the optical axis by an angle of 3° to 10° from the upper end to the lower end with respect to the vertical direction, and a bulb driving mechanism is provided, and when the headlamp tilts in the horizontal direction, the bulb driving mechanism rotates the light source bulb about the optical axis in an opposite direction to the tilting direction of the headlamp.

The "light source" is not limited to any specific light source if it is disposed coaxially with an optical axis extending substantially in the back/forth direction. Examples of the light sources are a filament of a halogen lamp or the like, and a discharge light emitting part of a discharge bulb.

The "shade member" is not limited in its construction in particular. For example, it may be an inner shade disposed under the light source, or a light shielding film formed, by coating, on a glass tube of the light source bulb.

The "a predetermined angular range" means an angular range having the central angle of 165° between the horizontal direction of the own lane side with respect to the optical axis and a direction slanting, at an angle of 15°, downward with respect to the horizontal direction of the oncoming lane side, or an angular range having the a central angle of 165°, of which the middle part is partially removed.

BRIEF DESCRIPTION OF THE PREFERRED EMBODIMENTS

The vehicle headlamp of the present invention is configured to effect the low-beam irradiation in the light distribution pattern in which the horizontal cut-off line is disposed on the oncoming lane side in the front direction of the lighting device. The horizontal cutoff line forming area is provided on the reflector or on the transparent cover. At least a part of the horizontal cutoff line forming area is formed with the plurality of reflection elements or lens elements, and those reflection elements or the lens elements slant toward the optical axis by an angle of 3° to 10° from the upper end to the lower end with respect to the vertical direction. The bulb driving mechanism is provided, and when the headlamp tilts in the horizontal direction, the bulb driving mechanism rotates the light source bulb about the optical axis in an opposite direction to the tilting direction of the headlamp. Therefore, the present invention thus constructed has the following useful operations and effects.

When the vehicle body rolls to the oncoming lane side, the vehicle headlamp also tilts to the rolling direction. The bulb driving mechanism rotates the light source bulb about the optical axis in an opposite direction to the tilting direction of the headlamp. Accordingly, the low-beam light distribution pattern is prevented from slanting to the rolling direction or from restraining such a slanting of the light distribution pattern. With this, it is possible to prevent the horizontal cut-off line from slanting downward to the oncoming lane side or to restrain such a slanting of the cut-off line. At this time, the reflection elements or the lens elements, forming at least a part of the horizontal cutoff line formed on the reflector or on the transparent cover, slant toward the optical axis by an angle of 3° to 10° from the upper end to the lower end with respect to the vertical direction. Accordingly, the reflection elements or the lens elements may be made to be put in almost in their crossing at right angles the light-dark borderline formed on the horizontal cutoff line forming area by the shade member of the light source bulb. As a result, even when the vehicle body rolls to the oncoming lane side, the horizontal cut-off line may be formed relatively sharply.

A headlamp which is configured to effect a low-beam irradiation in a light distribution pattern in which a horizontal cutoff line is disposed on an oncoming lane side with respect to the front direction of a lighting device. Thus, in the embodiment, even when the vehicle body rolls to the oncoming lane side, the horizontal cut-off line CL1 is kept in relative sharp. Further, it is possible to prevent the horizontal cut-off line CL1 from slanting to the oncoming lane side or to restrain such a slanting of the cut-off line. Accordingly, a visibility of a road surface in front of the vehicle is satisfactorily secured.

The reflection elements or the lens elements slant toward the optical axis by an angle of 3° to 10° with respect to the vertical direction. The slanting angle is so selected allowing for a roll angle of the vehicle body, which actually occurs. The reason for this follows.

The reason for that the slanting angle is set at "3°" or larger that if it is less than "3°", when the vehicle body rolls to the oncoming lane side, it is impossible to make the orientation of the reflection elements or lens elements forming at least a part of the horizontal cut-off line forming area sufficiently close to the direction in which those elements cross at right angles the light-dark borderline formed by the light source bulb. The reason for that the slanting angle is set at "10°" or smaller that when the reflection elements or lens elements forming at least a part of the horizontal cut-off line forming area are slanted, when the vehicle body does not roll, the orientation of the reflecting elements or the lens element is deviated from the direction crossing the light-dark borderline formed by the light source bulb. A sharpness of the horizontal cut-off line somewhat decreases. However, if the slanting angle exceeds 10°, the sharpness is out of the tolerable range which is satisfactory in securing a forward visibility of a driver even at the straight forward travelling of vehicle.

In the above-mentioned construction, an oblique cutoff line forming area for forming an oblique cutoff line slanting upward at angle of 15° from the front direction of the lighting device to its own lane in the light distribution pattern is provided on the reflector or the through-hole cover. When at least a part of the oblique cutoff line is formed a plurality of reflection elements or lens elements, those elements extend from the upper end to the lower end and slanting, at an angle of 18° to 25°, downward to the optical axis.

Specifically, when the vehicle body rolls to the own lane side, the reflection elements or lens elements may be made to be put almost in their crossing at right angles the light-dark borderline formed on the oblique cutoff line forming area by the shade member of the light source bulb. Thus, even when the vehicle body rolls to the own lane side, the oblique cut-off line CL2 is relatively sharply formed. Thus, even when the vehicle body rolls to the oncoming lane side, the oblique cut-off line is relatively sharply formed.

The reason why the tilting angle of the reflection elements or the lens elements with respect to the vertical direction is set at 18° to 25° is substantially the same as in the case of the horizontal cut-off line forming area.

If the bulb driving mechanism is constructed such that when the headlamp tilts in the horizontal direction, the bulb driving mechanism rotates the light source bulb about the optical axis in an opposite direction to the tilting direction of the headlamp, it may be constructed such that the light source bulb is turned to a predetermined angle by one step. If it is constructed such that the light source bulb is turned at a rotation quantity depending on the tilting angle of the headlamp, the control of preventing the horizontal cut-off line CL1 from slanting to the oncoming lane side or restraining such a slanting of the cut-off line, may be carried out finely. In the latter control, the light source bulb may be turned a multiple of steps or continuously.

The preferred embodiments of the present invention will be described with reference to the accompanying drawings.

Figure 1:
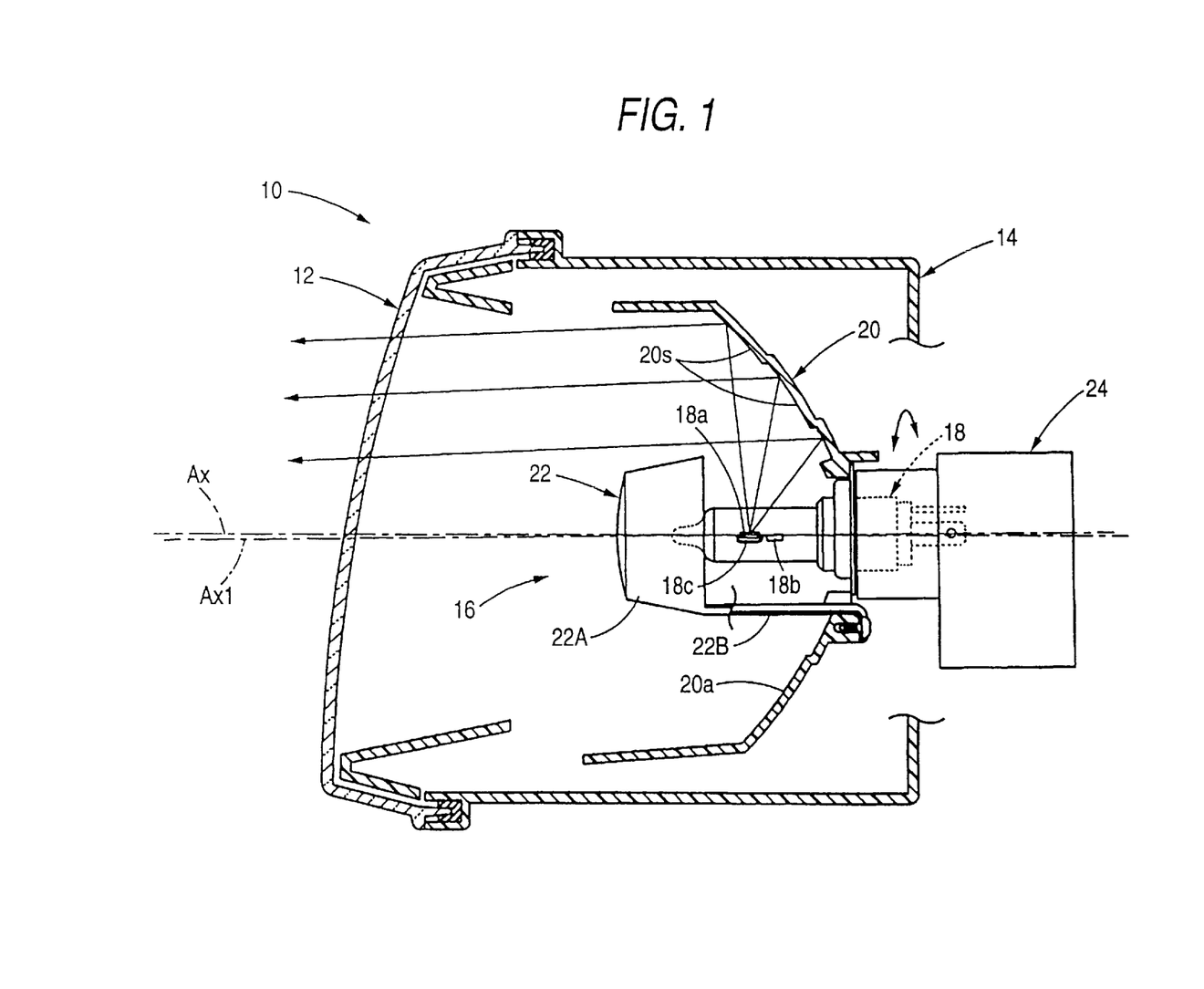
FIG. 1 is a side sectional view showing a vehicle headlamp 10 according to an embodiment of the present invention.

FIG. 1 is a side sectional view showing a vehicle headlamp 10 according to an embodiment of the present invention.

As shown, the vehicular headlamp 10 of this embodiment has a reflector unit 16 mounted in a lighting chamber formed by a transparent cover 12 of a plain type and a lamp body 14 in such that the reflector unit is vertically and laterally titable.

The reflector unit 16 has an optical axis Ax1 extending in a substantially longitudinal direction. More exactly, the optical axis Ax1 slightly (at an angle of approximately 0.5° to 0.6°) tilts downward with respect to an lamp reference axis Ax extending in the longitudinal direction of the vehicle when the reflector unit 16 is at the tilt reference position.

The reflector unit 16 includes a light source bulb 18, a reflector 20, an outer shade 22, and a bulb driving mechanism 24.

The light source bulb 18 is a halogen lamp having two filaments 18a and 18b, both extending in the optical axis Ax1 direction, an shade (shade member) 18c which surrounds the filament 18a over an angular range having the central angle of 165° developed about the optical axis Ax1 to block light going downward from the filament 18a (light source) located on the front side. The filament 18a is located coaxially with the optical axis Ax1.

The reflector 20 includes a reflective surface 20a having a plurality of reflection elements 20s formed on a surface defined by a paraboloid of revolution whose center axis is the optical axis Ax1. The reflecting surface 20a reflects forward light from the filament 18a or 18b in diffusing and deflecting manner. When the filament 18a is lit, a low beam irradiation is carried out, and when the filament 18b is lit, a high beam irradiation is carried out.

The outer shade 22 is made up of a cap part 22A, which covers the front end part of the light source bulb 18 such that it blocks direct light emanating from the filament 18a to the front of the lighting device, and a stay part 22B for supporting the cap part 22A. The outer shade is fixed to the reflector 20 at the rear end part of the stay part 22B.

A bulb driving mechanism 24 supports the light source bulb 18 in such that it rotatable about the optical axis Ax1. Specifically, when the vehicle body rolls (viz., when the vehicle headlamp 10 tilts to the horizontal directions), the bulb driving mechanism rotates the light source bulb 18 in the direction opposite to the rolling direction (i.e., the tilting direction of the vehicle headlamp 10) by an angle equal to the roll angle. With this feature, the attitude of the light source bulb 18 is always kept in an erect state irrespective of the rolling of the vehicle body. The roll angle of the vehicle body may be calculated from data such as suspension displacement of each wheel or cornering force acting on the vehicle body.

Figure 2:
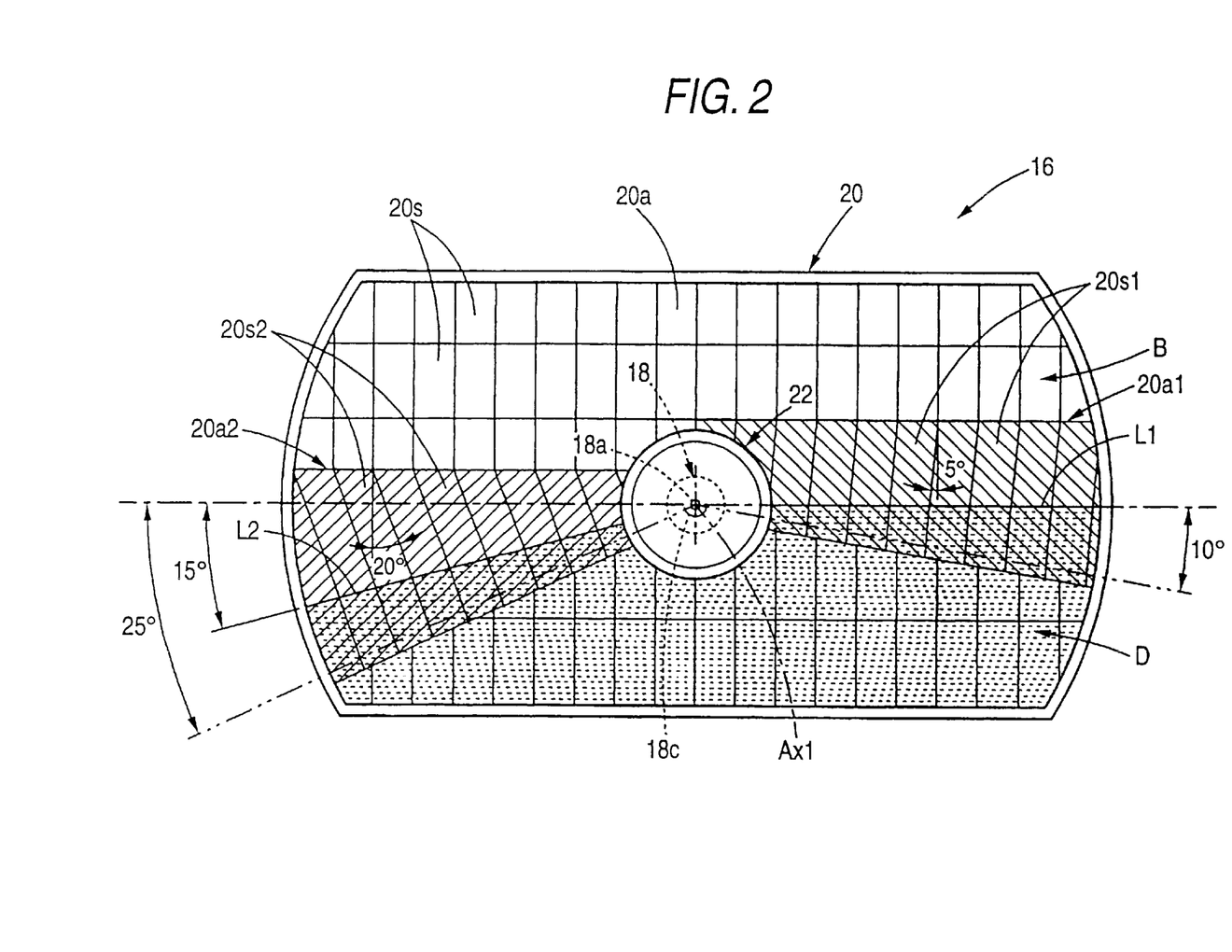
FIG. 2 is a front view showing a reflector unit of the vehicle headlamp, as a single part.

FIG. 2 is a front view showing a reflector unit of the vehicle headlamp, as a single part.

As shown, on the reflective surface 20a of the reflector 20, a region "D" indicated by broken lines in the figure is a light non-incident region on which light emitted by the filament 18a is not incident since it is blocked by the inner shade 18c, and the remaining region "B" is a light incident region on which a light emitted by the filament 18a is incident. Of light-dark borderlines L1 and L2 demarcate the light incident region B and the light non-incident region D, the light-dark borderline L1 located on the vehicle's own lane side (left side of the optical axis Ax1: right side in FIG. 2) extends from the optical axis Ax1 in the horizontal direction, and the light-dark borderline L2 located on the oncoming lane side (right side of the optical axis Ax1: left side in FIG. 2) extends downward from the optical axis Ax1 to the downward direction at an angle of 15°.

Figure 3:
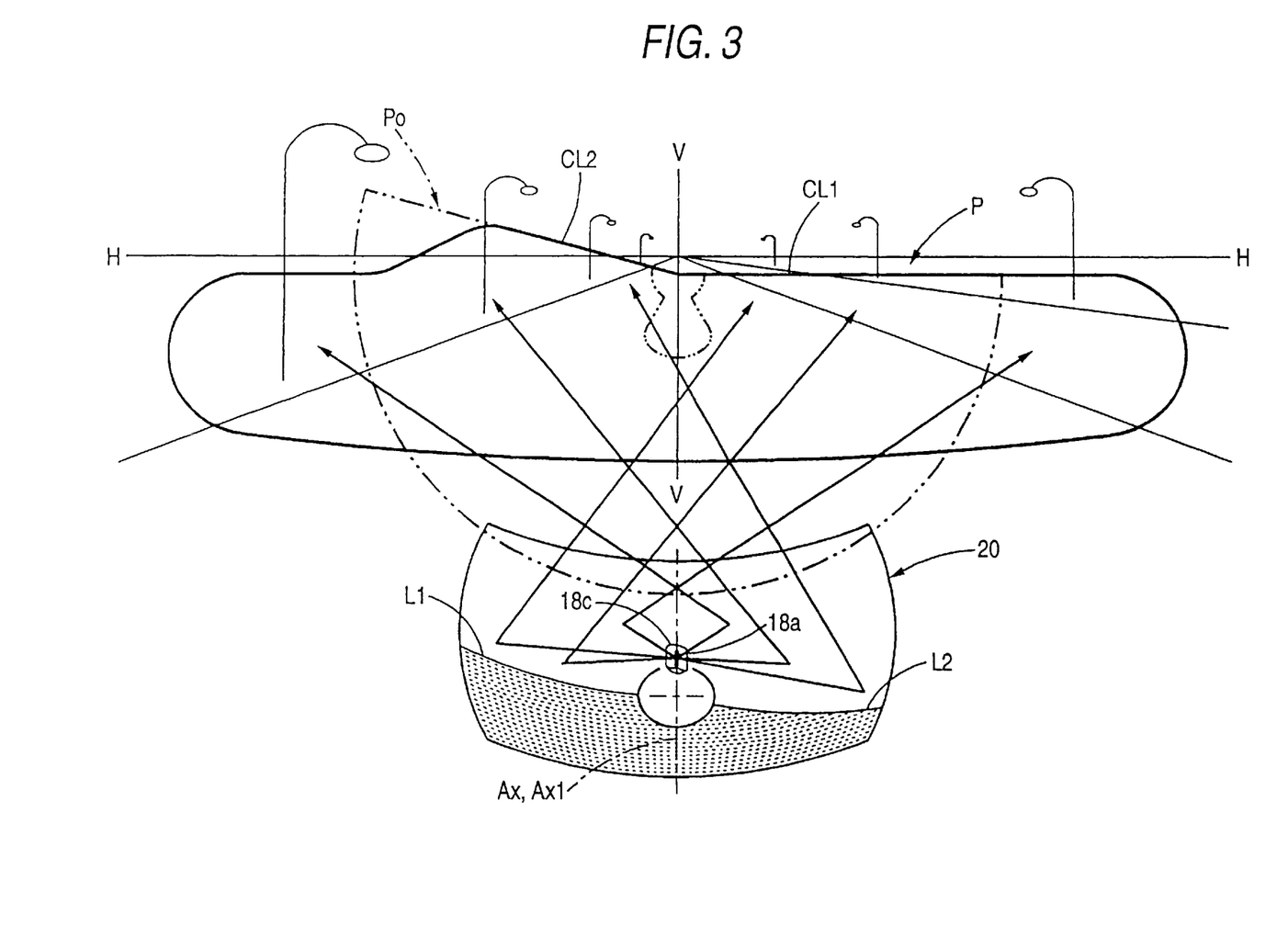
FIG. 3 is a perspective view showing a low beam light distribution pattern formed on an imaginary vertical screen, which is located at a position 25 m ahead of a lighting device, by a low beam irradiation of the vehicle headlamp, together with the reflector unit, the view being seen from the rear side of the reflector unit.

FIG. 3 is a perspective view showing a low beam light distribution pattern P formed on an imaginary vertical screen, which is located at a position 25 m ahead of a lighting device, by a low beam irradiation of the vehicle headlamp 10, together with the reflector unit 16, the view being seen from the rear side of the reflector unit 16.

As shown, the low-beam light distribution pattern P is a low-beam light distribution pattern for distributing light to the left. The low-beam light distribution pattern includes a horizontal cut-off line CL1 located on the right side (oncoming lane side) of a V—V line (a vertical line crossing the lamp reference axis Ax), and an oblique cut-off line CL2 rising at 15° from the horizontal cut-off line CL1 on the left side (vehicle's own lane side) of the V—V line. The horizontal cut-off line CL1 is formed slanting downward by an angular quantity of an angle difference between the lamp reference axis Ax and the optical axis Ax1 with respect to an H—H line (a horizontal line crossing the lamp reference axis Ax).

In the figure, a basic light distribution pattern Po indicated by a two-dot chain line is a low-beam light distribution pattern developed when the reflecting surface 20a of the reflector 20 is defined as a paraboloid of revolution whose central axis is the optical axis Ax1. The low-beam light distribution pattern P indicated by a sold line is formed by modifying the basic light distribution pattern Po by the diffusing, deflecting and reflecting functions of a plurality of reflection elements 20s formed on the reflective surface 20a.

As indicated by slanted lines in FIG. 2, a horizontal cut-off line forming area 20a1 and an oblique cut-off line forming area 20a2, while crossing the light-dark borderlines L1 and L2, are respectively provided on the left and right sides of the optical axis Ax1 on the reflective surface 20a. The horizontal cut-off line CL1 is formed by the diffusing, deflecting and reflecting functions of a plurality of reflection elements 20s1 forming the horizontal cut-off line forming area 20a1. The oblique cut-off line CL2 is formed by the diffusing, deflecting and reflecting functions of a plurality of reflection elements 20s2 forming the oblique cut-off line forming area 20a2.

In this case, the lower end of the horizontal cut-off line forming area 20a1 is located slightly under a straight line (indicated by two-dot chain line) extending downward at an angle of 10° from the optical axis Ax1. The lower end of the oblique cut-off line forming area 20a2 is located slightly under a straight line (indicated by two-dot chain line) extending downward at an angle of 25° from the optical axis Ax1.

The reflection elements 20s1 forming the horizontal cut-off line forming area 20a1 extend from the upper end to the lower end and slant, at an angle of 5°, downward to the optical axis Ax1 side with respect to the vertical direction. The reflection elements 20s2 forming the oblique cut-off line forming area 20a2 extend from the upper end to the lower end and slant, at an angle of 20°, downward to the optical axis Ax1 side with respect to the vertical direction.

Accordingly, the diffusing and deflecting directions of light reflected by the reflection elements 20s1 are deviated by an angle of 5° with respect to the horizontal direction in which the light-dark borderline L1 extends. The diffusing and deflecting direction of a light distribution pattern formed by the reflected light from the reflection elements 20s1, as indicated by arrows A1 in FIG. 4, slant at an angle of 5° with respect to the horizontal cut-off line CL1. The diffusing and deflecting directions of the light reflected by the reflection elements 20s2 is deviated by an angel of 5° with respect to the direction of the light-dark borderline L2 extending downward at an angle of 15°. The diffusing and deflecting directions of a light distribution pattern formed by the reflected light from the reflection elements 20s2, as indicated by arrows A2 in FIG. 4, slants at an angel of 5° with respect to the oblique cut-off line CL2. For this reason, the horizontal cut-off line CL1 and the oblique cut-off line CL2 somewhat decrease in sharpness, but those are kept in a tolerable range large enough to secure a forward visibility.

Figure 4:
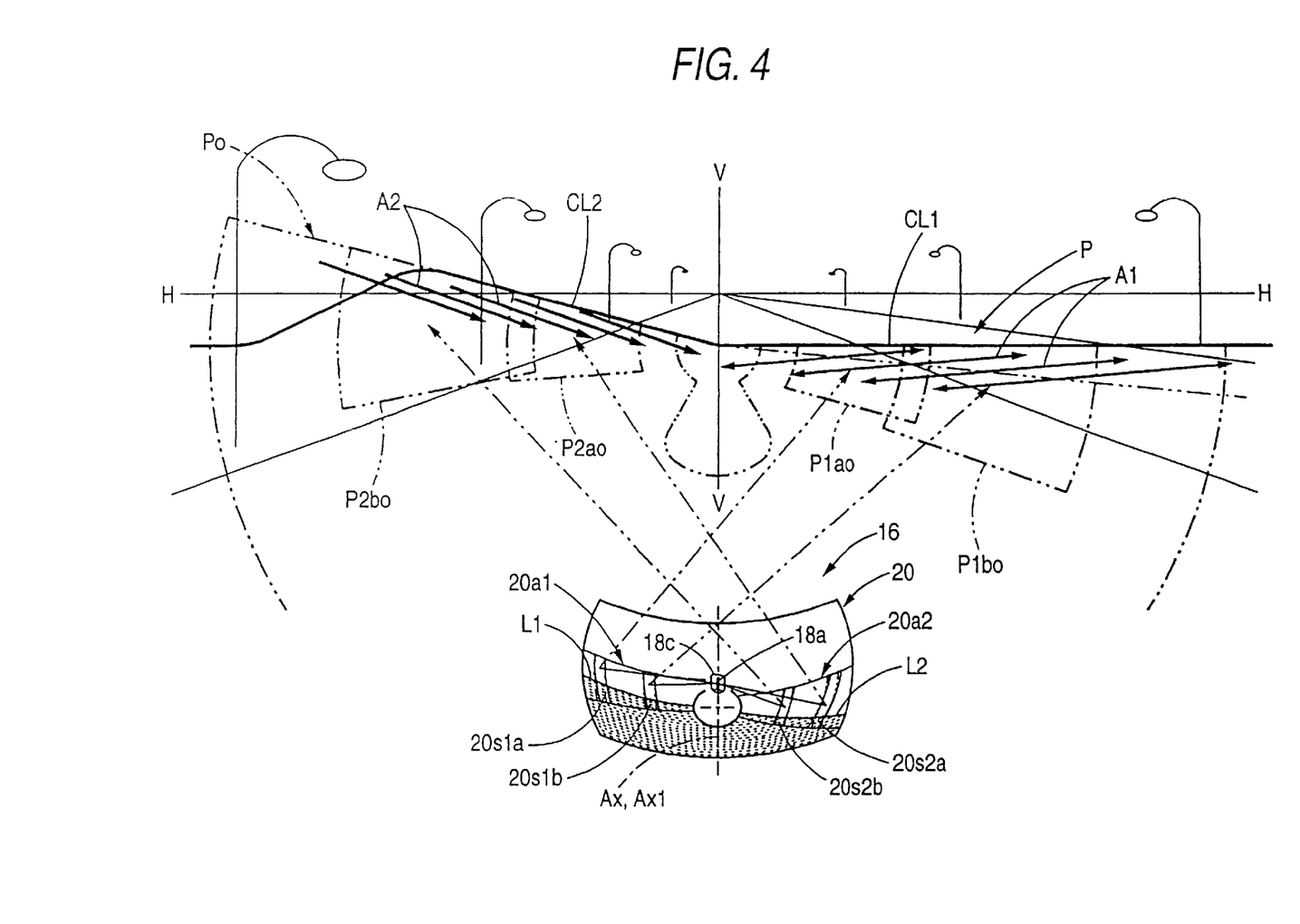
FIG. 4 is a diagram showing a key portion of FIG. 3.

Light distribution patterns P1*lo* and P1*bo*, as indicated by two-dot chain lines in FIG. 4, are segmental basic light distribution patterns, which are formed by the reflected lights from two reflection elements 20*s*1*a* and 20*s*1*b* of the plural reflection elements 20*s*1 forming the horizontal cut-off line forming area 20*a*1 on the assumption that the reflective surface 20*a* of the reflector 20 is defined by a paraboloid of revolution whose central axis is the optical axis Ax1. Light distribution patterns P2*lo* and P2*bo*, as indicated by two-dot chain lines in FIG. 4, are segmental basic light distribution patterns, which are formed by the reflected lights from two reflection elements 20*s*2*a* and 20*s*2*b* of the plural reflection elements 20*s*2 forming the oblique cut-off line forming area 20*a*2 on the assumption that the reflective surface 20*a* of the reflector 20 is a paraboloid of revolution whose central axis is the optical axis Ax1.

Figure 5:
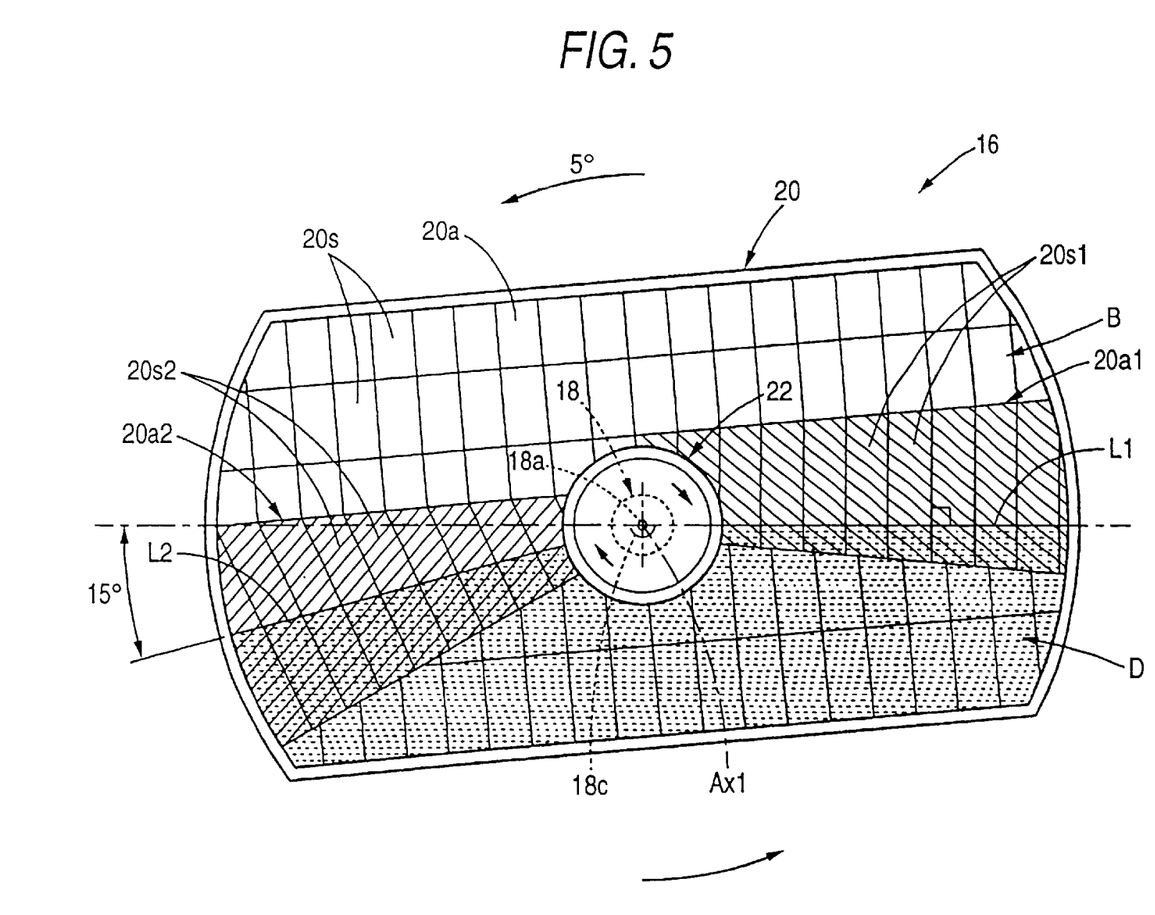
FIG. 5 is a front view showing a state of the reflector unit that the reflector unit is tilted at an angle of 5° to an oncoming lane side by the rolling of a vehicle body to the oncoming lane side.
Figure 6:
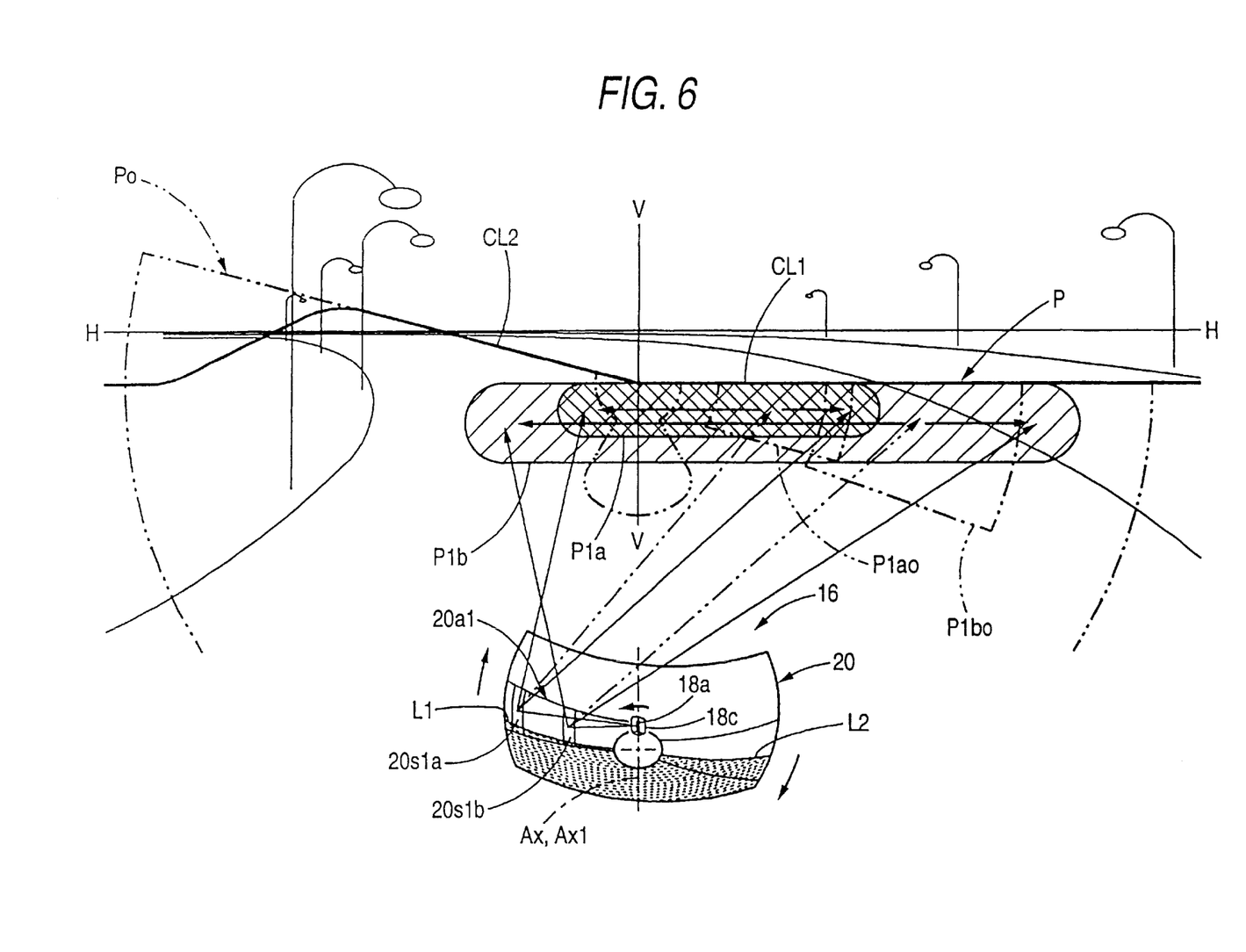
FIG. 6 is a perspective view showing a distribution pattern of a low beam, which is irradiated forward of the reflector unit, in a state that the reflector unit is tilted at 5° to the oncoming lane side, on the assumption that the vehicle is turning to the left.

FIG. 5 is a front view showing a state of the reflector unit 16 that the reflector unit is tilted at an angle of 5° to an oncoming lane side by the rolling of a vehicle body to the oncoming lane side. FIG. 6 is a perspective view showing a light distribution pattern P of the low beam, which is irradiated forward of the reflector unit 16, in a state mentioned above, on the assumption that the vehicle is turning to the left.

In a state that the reflector unit 16 is tilted at an angle of 5° to the oncoming lane side, the reflection elements 20*s*1 forming the horizontal cut-off line forming area 20*a*1 extend in the vertical direction. On the other hand, the light source bulb 18 is rotated in an opposite direction to the rolling direction by the bulb driving mechanism 24, and is kept in an erect state. Accordingly, the light-dark borderline L1 of the vehicle's own lane side extends from the optical axis Ax1 in the horizontal direction.

In this state, the reflection elements 20*s*1 are disposed orthogonal to the light-dark borderline L1. Accordingly, the diffusing and deflecting directions of the light reflected by the reflection elements 20*s*1 extend along the horizontal directions in which the light-dark borderline L1 extends. As a result, the clear horizontal cut-off line CL1 is formed by the light distribution pattern formed by the reflected light from the reflection elements 20*s*1. In FIG. 6, the two reflection elements 20*s*1*a* and 20*s*1*b* of the plural reflection elements 20*s*1 forming the horizontal cut-off line forming area 20*a*1 are typically used for illustrating the segmental light distribution patterns P1*a* and P1*b* formed by the reflected light from the reflection elements 20*s*1*a* and 20*s*1*b*.

Figure 7:
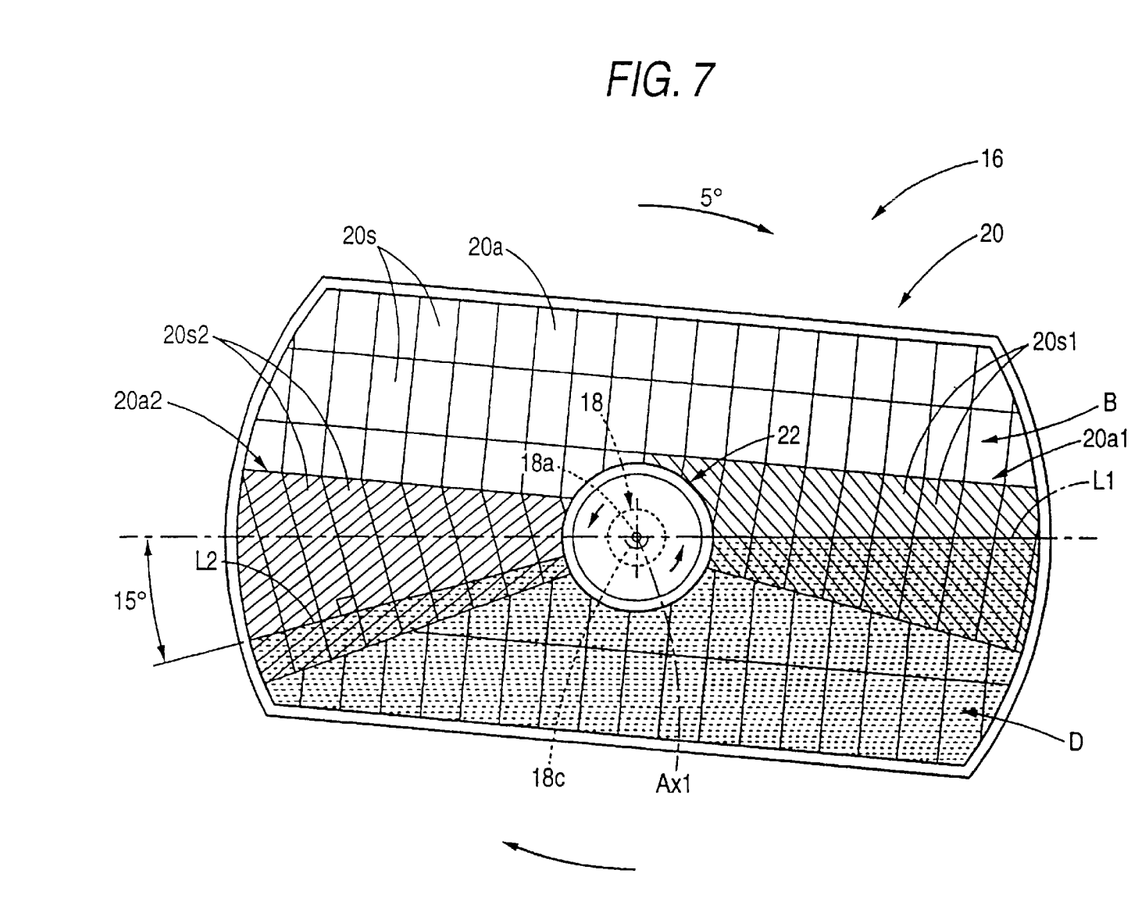
FIG. 7 is a front view showing a state of the reflector unit when it is tilted at 5° to a vehicle's own lane side by a vehicle body roll to its own lane side.
Figure 8:
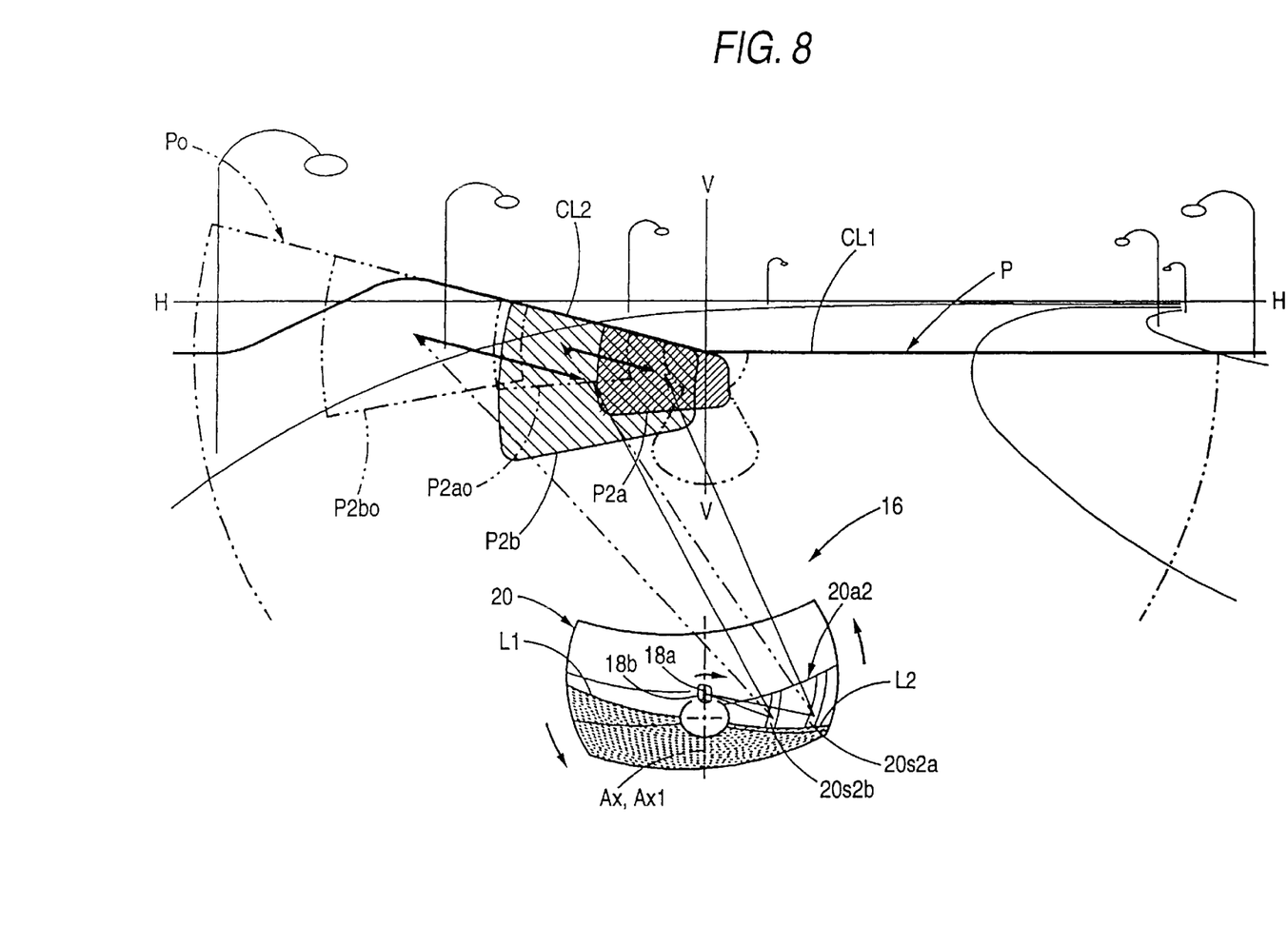
FIG. 8 is a perspective view showing a distribution pattern of a low beam, which is irradiated forward of the reflector unit, in a state that the reflector unit is tilted at 5° to the oncoming lane side, on the assumption that the vehicle is turning to the right.

FIG. 7 is a front view showing a state of the reflector unit 16 when it is tilted at 5° to a vehicle's own lane side by a vehicle body roll to its own lane side. FIG. 8 is a perspective view showing the distribution pattern P of the low beam, which is irradiated forward of the reflector unit 16, in a state mentioned above, on the assumption that the vehicle is turning to the right.

In a state when the reflector unit 16 is tilted at an angle of 5° to the own lane side, the reflection elements 20*s*2 forming the oblique cut-off line forming area 20*a*2 extend in a direction slanting, at an angle of 15°, with respect to the vertical direction. On the other hand, the light source bulb 18 is rotated in an opposite direction to the rolling direction by the bulb driving mechanism 24 and is kept erect. The light-dark borderline L2 of the vehicle's own lane side extends from the optical axis Ax1 in the direction slanting downward at an angle of 15°.

And, the reflection elements 20*s*2 are disposed orthogonal to the light-dark borderline L2. Accordingly, the diffusing and deflecting directions of a light reflected by the reflection elements 20*s*2 extend along a direction which slants downward at 15° in which the light-dark borderline L2 extends. As a result, the clear oblique cut-off line CL2 is formed by the light distribution pattern formed by the reflected light from the reflection elements 20*s*2. In FIG. 8, the two reflection elements 20*s*2*a* and 20*s*2*b* of the plural reflection elements 20*s*2 forming the oblique cut-off line forming area 20*a*2 are typically used for illustrating the segmental light distribution patterns P2*a* and P2*b* formed by reflected lights from the reflection elements 20*s*2*a* and 20*s*2*b*.

As elaborately described above, the vehicle headlamp 10 of the present embodiment is arranged to effect low beam irradiation in a low-beam light distribution pattern P in which a horizontal cut-off line CL1 is disposed on the oncoming lane side with respect to the front direction of the lighting device. The horizontal cut-off line forming area 20*a*1, which is provided on the reflector 20, is formed with a plurality of reflection elements 20*s*1. Those reflection elements 20*s*1 are formed extending from the upper end to the lower end and slanting, at an angle of 5°, downward to the optical axis Ax1 with respect to the vertical direction. The bulb driving mechanism 24 is provided, and when the headlamp 10 tilts in the horizontal direction, the bulb driving mechanism 24 rotates the light source bulb 18 about the optical axis Ax1 in an opposite direction to the tilting direction of the headlamp 10. Therefore, the vehicle headlamp accrues to the following operation and effects.

When the vehicle body rolls to the oncoming lane side, the vehicle headlamp 10 also tilts to the rolling direction. The bulb driving mechanism 24 turns the light source bulb 18 about the optical axis Ax1 in a direction opposite to the rolling direction by an angle equal to the inclination angle of the vehicle headlamp 10, whereby the posture of the light source bulb is kept in an erect state. Accordingly, the low-beam light distribution pattern P is prevented from slanting to the rolling direction. As a result, the horizontal. cut-off line CL1 is prevented from slanting downward to the oncoming lane side. In this case, the reflection elements 20*s*1 forming the horizontal cut-off line forming area 20*a*1 of the reflector 20 extend from the upper end to the lower end and slanting, at an angle of 5°, downward to the optical axis Ax1 with respect to the vertical direction. Accordingly, the reflection elements 20*s*1 may be made to be put in almost in their crossing at right angles the light-dark borderline L1 formed on the horizontal cut-off line forming area 20*a*1 by the inner shade 18*c* of the light source bulb 18. As a result, even when the vehicle body rolls to the oncoming lane side, the horizontal cut-off line CL1 may be formed relatively sharply.

Thus, in the embodiment, even when the vehicle body rolls to the oncoming lane side, the horizontal cut-off line CL1 is kept in relative sharp. Further, it is possible to prevent the horizontal cut-off line CL1 from slanting downward to the oncoming lane side or to restrain such a slanting of the cut-off line. Accordingly, a visibility of a road surface in front of the vehicle is satisfactorily secured.

Particularly, in the embodiment, the slanting angle of the reflection elements 20*s*1 forming the horizontal cut-off line forming area 20*a*1 with respect to the vertical direction is set at 5°. Within a rolling angular range caused in accordance with a normal vehicle traveling situation, when the vehicle body rolls to the oncoming lane side, the orientation of the reflection elements 20*s*1 may be made to be sufficiently close to the direction in which those elements cross at right angles the light-dark borderline L1 formed by the light source bulb 18. Also when the vehicle body does not roll, the orientation of the reflection elements 20s1 is not largely deviated from the direction in which the reflection elements cross at right angles the light-dark borderline L1. Accordingly, a sharpness of the horizontal cut-off line CL1 somewhat decreases, but a degree of sharpness may be kept within a tolerable range.

Also in the embodiment, the oblique cut-off line forming area 20a2 is provided on the reflector 20 to form the oblique cut-off line CL2 slanting, at an angle of 15°, upward from the front direction of the lighting device to the own lane side in the low-beam light distribution pattern P. The oblique cut-off line forming area 20a2 is formed with a plurality of reflection elements 20s2. Those reflection elements 20s2 are formed extending from the upper end to the lower end and slanting, at an angle of 20°, downward to the optical axis Ax1 with respect to the vertical direction.

Accordingly, even when the vehicle body rolls to the own lane side, the reflection elements 20s2 may be made to be put almost in their crossing at right angles the light-dark borderline L2 formed on the oblique cut-off line forming area 20a2 by the inner shade 18c of the light source bulb 18. Thus, even when the vehicle body rolls to the own lane side, the oblique cut-off line CL2 is relatively sharply formed.

A slanting angle of the reflection elements 20s2 forming the oblique cut-off line forming area 12a2 with respect to the vertical direction is set at 20°. Within a rolling angular range caused in accordance with a normal vehicle traveling situation, when the vehicle body rolls to the own lane side, the orientation of the reflection elements 20s2 may be made to be sufficiently close to the direction in which those elements cross at right angles the light-dark borderline L2 formed by the light source bulb 18. Also when the vehicle body does not roll, the orientation of the reflection elements 20s2 is not largely deviated from the direction in which the reflection elements cross at right angles the light-dark borderline L2. Accordingly, a sharpness of the oblique cut-off line CL2 somewhat decreases, but a degree of sharpness may be kept within a tolerable range.

Also in the present embodiment, the lower end of the horizontal cut-off line forming area 20a1 is positioned slightly under a straight line extending from the optical axis Ax1 downward by an angle of 10°. When the vehicle body rolls to the oncoming lane side, if its rolling angle is 10° or smaller, there is no chance that the light-dark borderline L1 is put to be out of the horizontal cut-off line forming area 20a1. Therefore, it is possible to secure the horizontal cut-off line CL1 being relatively sharp. Similarly, the lower end of the oblique cut-off line forming area 20a2 is positioned slightly under a straight line extending downward from the optical axis Ax1 by an angle of 25°. When the vehicle body rolls to the own lane side, if its rolling angle is 10° or smaller, there is no chance that the light-dark borderline L2 is put to be out of the oblique cut-off line forming area 20a2. Therefore, it is possible to secure the oblique cut-off line CL2 being relatively sharp.

A modification of the embodiment will be described hereunder.

Figure 9:
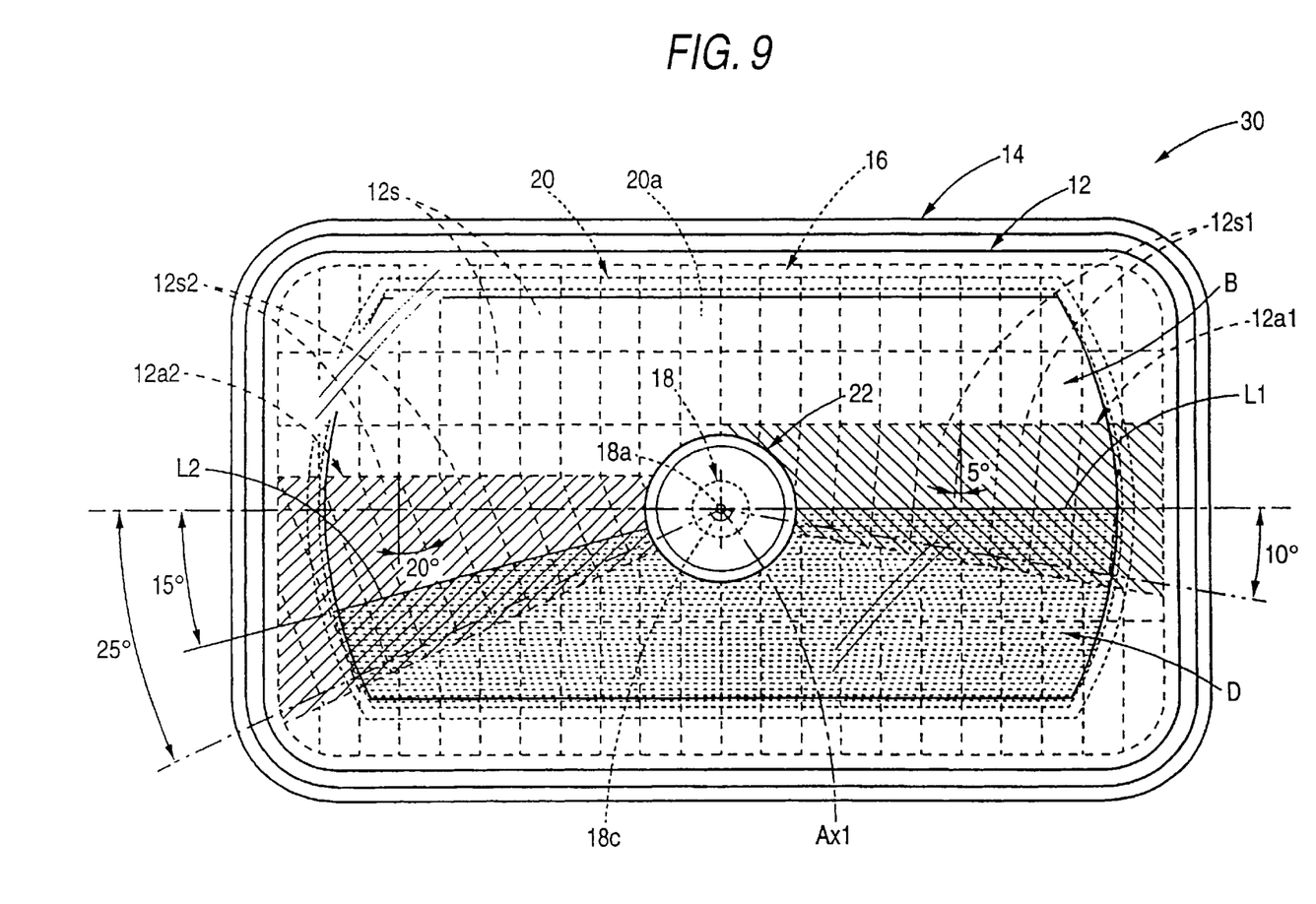
FIG. 9 is a front view showing a vehicle headlamp which is a modification of the above embodiment.

FIG. 9 is a front view showing vehicle headlamp 30 which is a modification of the embodiment.

A basic lighting device construction of the vehicle headlamp 30 is also similar to that of the vehicle headlamp 10 of the above-mentioned embodiment. In the vehicle headlamp 10, the transparent cover 12 is of the plain type, and the light distribution control is carried out by use of a plurality of reflection elements 20s formed on the reflective surface 20a of the reflector 20. On the other hand, in the vehicle headlamp 30 of the instant modification, a plurality of lens elements 12s are formed on the transparent cover 12. The light distribution control is carried out by use of those lens elements 12s.

In the vehicle headlamp 30 of the modification, the reflective surface 20a of the reflector 20 is configured to have a surface defined by a paraboloid of revolution whose center axis is the optical axis Ax1. A low beam irradiation may be carried out in a low-beam light distribution pattern, which resembles the low-beam light distribution pattern P shown in FIG. 3, by diffusing and deflecting parallel rays of light reflected by the reflective surface 20a by a plurality of lens elements 12s.

A horizontal cut-off line forming area 12a1 and a oblique cut-off line forming area 12a2 are formed on the transparent cover 12, while crossing the light-dark borderlines L1 and L2 in a front view of the lighting device. The horizontal cut-off line CL1 is formed by use of the diffusing, deflecting and transmitting functions of a plurality of the lens elements 12s1 forming the horizontal cut-off line forming area 12a1. The oblique cut-off line CL2 is formed by use of the diffusing, deflecting and transmitting functions of a plurality of lens elements 12s2 forming the oblique cut-off line forming area 12a2.

The lens elements 12s1 forming the horizontal cut-off line forming area 12a1 extend from the upper end to the lower end and slanting, at an angle of 5°, downward to the optical axis Ax1 with respect to the vertical direction. The lens elements 12s2 forming the oblique cut-off line forming area 12a2 extend from the upper end to the lower end and slanting, at an angle of 20°, downward to the optical axis Ax1 with respect to the vertical direction.

Accordingly, the diffusing and deflecting directions of the transmitted light by the lens elements 12s1 are deviated by an angle 5° from the horizontal direction in which the light-dark border line L1 extends. The diffusing and deflecting directions of a light distribution pattern, which is formed by the transmitted light from the lens elements 12s1, are tilted by an angle of 5° with respect to the horizontal cut-off line CL1 as indicated by arrows A1 in FIG. 4. The diffusing and deflecting directions of the transmitted light from the lens elements 12s2 are deviated by an angle 5° from a downward 15° direction in which the light-dark borderline L2 extends. The diffusing and deflecting directions of a light distribution pattern, which is formed by the transmitted light from the lens elements 12s2, are tilted by an angle of 5° with respect to the oblique cut-off line CL2 as indicated by arrows A2 in FIG. 4. Accordingly, when the vehicle body does not roll, a sharpness of the horizontal cut-off line CL1 and the oblique cut-off line CL2 somewhat decreases, but it is kept within a tolerable range which is satisfactory in securing a forward visibility of a driver.

When the vehicle body rolls to the oncoming lane side, the lens elements 12s1 tilted by 5° with respect to the vertical direction is put almost in their crossing at right angles the light-dark borderline L1. Therefore, the horizontal cut-off line CL1 may be formed relatively sharp. When the vehicle body rolls to the own lane side, the lens elements 12s2 tilted by 20° with respect to the vertical direction is put almost in their crossing at right angles the light-dark borderline L2. The oblique cut-off line CL2 may be formed relatively sharp.

In the instant modification. When the vehicle body rolls to the oncoming lane side, the horizontal cut-off line CL1 is kept relatively sharply, and it is possible to prevent the horizontal cut-off line CL1 from slanting downward to the oncoming lane side or to restrain such a slanting of the cut-off line. Accordingly, a visibility of a road surface in front of the vehicle is satisfactorily secured.

Particularly, the slanting angle of the lens elements 12s1 forming the horizontal cut-off line forming area 12a1 with respect to the vertical direction is set at 5°. Within a rolling angular range caused in accordance with a normal vehicle traveling situation, when the vehicle body rolls to the oncoming lane side, the orientation of the reflection elements 12s1 may be made to be sufficiently close to the direction in which those elements cross at right angles the light-dark borderline L1 formed by the light source bulb 18. Similarly, the slanting angle of the lens elements 12s2 forming the oblique cut-off line forming area 12a2 with respect to the vertical direction is set at 20°. Within a rolling angular range caused in accordance with a normal vehicle traveling situation, when the vehicle body rolls to the own lane side, the orientation of the lens elements 12s2 may be made to be sufficiently close to the direction in which those elements cross at right angles the light-dark borderline L2 formed by the light source bulb 18. Also when the vehicle body does not roll, the orientation of the lens elements 12s1 and 12s2 is not largely deviated from the direction in which the lens elements cross at right angles the light-dark borderlines L1 and L2. Accordingly, a sharpness of the horizontal cut-off line CL1 and the oblique cut-off line CL2 somewhat decreases, but a degree of sharpness may be kept within a tolerable range.

While in the embodiment and the modification, the reflection elements 20s1 and the lens elements 12s1, which form the horizontal cut-off line forming area 20a1 and the horizontal cut-off line forming area 12a1, are all tilted at an angle of 5° with respect to the vertical direction, some of the reflection elements 20s1 and the lens elements 12s1, which form the horizontal cut-off line forming area 20a1 and the horizontal cut-off line forming area 12a1, may be tilted at an angle of 5° with respect to the vertical direction. In this case, the reflected light and transmitted light from the reflection elements 20s1 and the lens elements 12s1, closer to the outer peripheral ends in the horizontal cut-off line forming areas 20a1 and 12a1 greatly contribute to the formation of the horizontal cut-off line CL1. The reflection elements 20s1 and the lens elements 12s1 located close to those outer peripheral ends are preferably tilted at an angle of 5° with respect to the vertical direction.

While in the embodiment and the modification, the reflection elements 20s2 and the lens elements 12s2 forming the oblique cut-off line forming areas 20a2 and 12a2 are all tilted by an angle of 20° with respect to the vertical direction, some of the reflection elements 20s2 and the lens elements 12s2 forming the oblique cut-off line forming areas 20a2 and 12a2 maybe tilted by an angle of 20° with respect to the vertical direction. In this case, the reflected light and transmitted light from the reflection elements 20s2 and the lens elements 12s2, closer to the outer peripheral ends in the oblique cut-off line forming areas 20a2 and 12a2, greatly contribute to the formation of the oblique cut-off line CL2. The reflection elements 20s2 and the lens elements 12s2 located close to those outer peripheral ends are preferably tilted at an angle of 20° with respect to the vertical direction.

In the embodiment and the modification, a tilting angle of each of the reflection elements 20s1 and the lens elements 12s1 forming the horizontal cut-off line forming areas 20a1 and 12a1 with respect to the vertical direction is 5°, and a tilting angle of each of the reflection elements 20s2 and the lens elements 12s2 forming the oblique cut-off line forming areas 20a2 and 12a2 is 20°. The tilting angle may be selected to have any other suitable value of angle other than 20° depending on the roll characteristics and others of the vehicle.

What is claimed is:

1. A vehicle headlamp configured to effect a low-beam irradiation in a light distribution pattern in which a horizontal cut-off line is disposed on the oncoming lane side in the front direction of a lighting device, said headlamp comprising:

a light source bulb including a light source disposed coaxially with an optical axis extending substantially in the back/forth direction, and a shade member which covers said light source over a predetermined angular range;

a reflector for reflecting the light from said light source to the front;

a translucent cover provided in front of said reflector; and a bulb driving mechanism is provided, and when said headlamp tilts in the horizontal direction, said bulb driving mechanism rotates said light source bulb about said optical axis in an opposite direction to said tilting direction of said headlamp, wherein a horizontal cut-off line forming area for controlling a light distribution for forming said horizontal cut-off line is provided on said reflector or said translucent cover, at least a part of said horizontal cut-off line forming area is formed with a plurality of reflection elements or lens elements, and said reflection elements or said lens elements slant toward said optical axis by an angle of 3° to 10° from the upper end to the lower end with respect to the vertical direction.

2. A vehicle headlamp according to claim 1, wherein an oblique cut-off line forming area for forming an oblique cut-off line slanting upward at angle of 15° from the front direction of the lighting device to its own lane in said light distribution pattern is provided on said reflector or said translucent cover, and at least a part of said oblique cut-off line is formed a plurality of reflection elements or lens elements, and those elements extend from the upper end to the lower end and slanting, at an angle of 18° to 25°, downward to the optical axis.

3. A vehicle headlamp according to claim 1, wherein said bulb driving mechanism rotates said light source bulb by a quantity of rotation defined by a tilting angle of said headlamp.

4. A vehicle headlamp according to claim 2, wherein said bulb driving mechanism rotates said light source bulb by a quantity of rotation defined by a tilting angle of said headlamp.

* * * * *